(12) United States Patent
Bourgeois et al.

(10) Patent No.: US 9,179,799 B1
(45) Date of Patent: *Nov. 10, 2015

(54) SMOKER APPARATUS

(75) Inventors: Norman R. Bourgeois, Jefferson, LA (US); Michael Bourgeois, Kenner, LA (US)

(73) Assignee: METAL FUSION, INC., Jefferson, LA (US)

(*) Notice: Subject to any disclaimer, the term of this patent is extended or adjusted under 35 U.S.C. 154(b) by 423 days.

This patent is subject to a terminal disclaimer.

(21) Appl. No.: 12/768,512

(22) Filed: Apr. 27, 2010

Related U.S. Application Data

(63) Continuation of application No. 11/696,305, filed on Apr. 4, 2007, now Pat. No. 7,703,386.

(60) Provisional application No. 60/790,453, filed on Apr. 6, 2006.

(51) Int. Cl.
*A47J 37/07* (2006.01)
*A23B 4/03* (2006.01)
(Continued)

(52) U.S. Cl.
CPC ............. *A47J 37/0611* (2013.01); *A23B 4/052* (2013.01)

(58) Field of Classification Search
CPC ............. A47J 37/0704; A47J 37/0611; A47J 37/0763; A47J 37/0713; A47J 39/00; A47J 36/24; A23B 4/052; A23B 7/144; F24C 15/16; F24C 15/08; F24C 15/12; F24C 3/085; F24C 3/027; F24C 3/14; F24C 11/00; F24C 13/00; A21B 3/04; A21B 1/02; A47B 31/02; F24B 1/205

USPC .......... 99/339, 340, 352, 448, 467, 481, 482; 126/9 R, 25 R, 41 R, 337 R, 1 R, 39 R, 126/19 R, 20, 268, 261, 29, 30, 55, 37 R, 126/37 A, 37 B, 4, 5, 40

See application file for complete search history.

(56) References Cited

U.S. PATENT DOCUMENTS 2,004,024 A * 6/1935 Van Voorst, Jr ............. 126/41 D
4,721,037 A * 1/1988 Blosnich ......................... 99/482
(Continued)

*Primary Examiner* — Dana Ross
*Assistant Examiner* — Hemant Mathew
(74) *Attorney, Agent, or Firm* — Garvey, Smith, Nehrbass & North, L.L.C.; Charles C. Garvey, Jr.; Brett A. North

(57) ABSTRACT

A smoker apparatus is disclosed that provides a smoker cabinet having upper and lower end portions. The cabinet has a top, a bottom and a side wall or walls and an interior. The cabinet includes a plurality of vertically spaced apart shelves mounted within the cabinet interior. A cabinet door that enables access to the shelves. A gaseous fuel supplied burner element is positioned next to the lower end portion of the cabinet, the burner element being removably connectable to a source of gaseous fuel. A pair of containers is mounted within the cabinet below the shelves and above the burner element. One of the containers is preferably a water container for containing water. The other of the containers being a wood chips container for containing wood chips, wherein the wood chips container is positioned in between the water container and the burner element. A slide bracket supports the containers, the slide bracket positioned generally in between the burner element and the shelves. An access door is provided that is much smaller than the cabinet door, the access door extending vertically a distance at least spanning the vertical dimension of the containers. Either container can be removed laterally from the cabinet at least a partial distance by sliding it laterally upon the slide bracket and at least partially through the access door.

26 Claims, 9 Drawing Sheets

(51) Int. Cl.
*A23B 4/044* (2006.01)
*B60H 3/00* (2006.01)
*A47J 37/06* (2006.01)
*A23B 4/052* (2006.01)

(56) References Cited

U.S. PATENT DOCUMENTS

| | | | | |
|---|---|---|---|---|
| 4,730,100 | A | * | 3/1988 | Pingelton ................ 219/400 |
| 4,869,163 | A | * | 9/1989 | Haskins .................. 99/482 |
| 4,924,071 | A | * | 5/1990 | Jacobs ................... 219/400 |
| 5,078,049 | A | * | 1/1992 | Glanton .................. 99/482 |
| 5,163,359 | A | * | 11/1992 | McLane, Sr. ............. 99/447 |
| 5,531,154 | A | * | 7/1996 | Perez, III ................ 99/340 |
| 5,711,209 | A | * | 1/1998 | Guines ................... 99/339 |
| 5,813,321 | A | * | 9/1998 | Bourgeois ................ 99/340 |
| 5,891,498 | A | * | 4/1999 | Boehler .................. 426/314 |
| 5,970,852 | A | | 10/1999 | Bourgeois |
| 6,012,381 | A | * | 1/2000 | Hawn ..................... 99/340 |
| 6,058,830 | A | * | 5/2000 | Bourgeois ................ 99/340 |
| 6,314,869 | B1 | * | 11/2001 | Bourgeois, Jr. ........... 99/340 |
| 6,439,107 | B1 | * | 8/2002 | Bourgeois ................ 99/340 |
| 6,626,089 | B1 | * | 9/2003 | Hubert ................... 99/339 |
| 6,698,335 | B1 | * | 3/2004 | Bourgeois ................ 99/340 |
| 6,708,604 | B1 | * | 3/2004 | Deichler, Jr. ............. 99/482 |
| 7,237,476 | B1 | | 7/2007 | Bourgeois et al. |
| 7,325,482 | B1 | | 2/2008 | Bourgeois et al. |
| 7,426,885 | B2 | * | 9/2008 | McLemore et al. ......... 99/482 |
| 7,703,386 | B1 | * | 4/2010 | Bourgeois et al. ......... 99/340 |
| 2005/0034716 | A1 | * | 2/2005 | Harbin ................... 126/25 R |
| 2005/0121018 | A1 | * | 6/2005 | Rosen .................... 126/9 R |

\* cited by examiner

SMOKER APPARATUS

CROSS-REFERENCE TO RELATED APPLICATIONS

This is a continuation of U.S. Ser. No. 11/696,305, filed 4 Apr. 2007 (now U.S. Pat. No. 7,703,386), which claims priority of U.S. Provisional Patent Application Ser. No. 60/790,453, filed Apr. 6, 2006, all of which are incorporated herein by reference.

Priority of U.S. Provisional Patent Application Ser. No. 60/790,453, filed Apr. 6, 2006, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an improved smoker apparatus that is preferably fueled with a gaseous fuel source such as butane or propane supplied for example via a pressurized cannister, hose and regulator. More particularly, the present invention relates to a smoker apparatus of improved configuration that provides a vertically extended cabinet having a plurality of shelves for containing food items that are to be smoked, a pair of pans that are mounted under the plurality of shelves, a front door that enables access to the plurality of shelves and a side door that is much smaller than the front door and that is mounted near the bottom of the cabinet wherein the side door can be opened to enable access to a water pan and a wood chips pan both of which are slidably mounted upon a wire frame having upper and lower spaced apart rails, one set of rails for supporting the water pan and a lower set of rails for supporting the pan of wood chips.

2. General Background of the Invention

Many smokers are commercially available that are used for smoking food items such as poultry, beef, sausage or the like. Some of these smokers are vertically extended cabinets that have a front door and that have water pans and wood chip pans for generating smoke during use. Several such vertically extended cabinet type smokers having shelves for holding food items can be seen at Cabelas online catalog (www.cabelas.com).

The following U.S. Patents are incorporated herein by reference:

TABLE

| patent No. | TITLE | ISSUE DATE |
| --- | --- | --- |
| 4,721,037 | Smoker Apparatus for An Outdoor Barbecue Grill | Jan. 26, 1988 |
| 4,869,163 | Smoking Unit for Gas Grills | Sep. 26, 1989 |
| 5,163,359 | Cooking Apparatus | Nov. 17, 1992 |
| 5,891,498 | Barbecue Grill Smoker Attachment and Method of Smoking Food Products | Apr. 6, 1999 |
| 6,012,381 | Convection Meat Cooker | Jan. 11, 2000 |
| 6,626,089 | Cooking and Smoking Apparatus | Sep. 30, 2003 |
| 2005/0034716 | Portable Compact Cooking Appliance | Feb. 17, 2005 |
| 2005/0121018 | Combination Barbecue Grill, Smoker and Fireplace | Jun. 9, 2005 |

BRIEF SUMMARY OF THE INVENTION

A smoker apparatus provides a smoker cabinet having upper and lower end portions. The cabinet has a top, a bottom and a side wall or walls and an interior.

The cabinet includes a plurality of vertically spaced apart shelves mounted within the cabinet interior.

A cabinet door that enables access to the shelves.

A gaseous fuel supplied burner element is positioned next to the lower end portion of the cabinet, the burner element being removably connectable to a source of gaseous fuel.

A pair of containers is mounted within the cabinet below the shelves and above the burner element.

One of the containers is preferably a water container for containing water. The other of the containers being a wood chips container for containing wood chips, wherein the wood chips container is positioned in between the water container and the burner element.

A slide bracket supports the containers, the slide bracket positioned generally in between the burner element and the shelves.

An access door is provided that is much smaller than the cabinet door, the access door extending vertically a distance at least spanning the vertical dimension of the containers; and Either container can be removed laterally from the cabinet at least a partial distance by sliding it laterally upon the slide bracket and at least partially through the access door.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
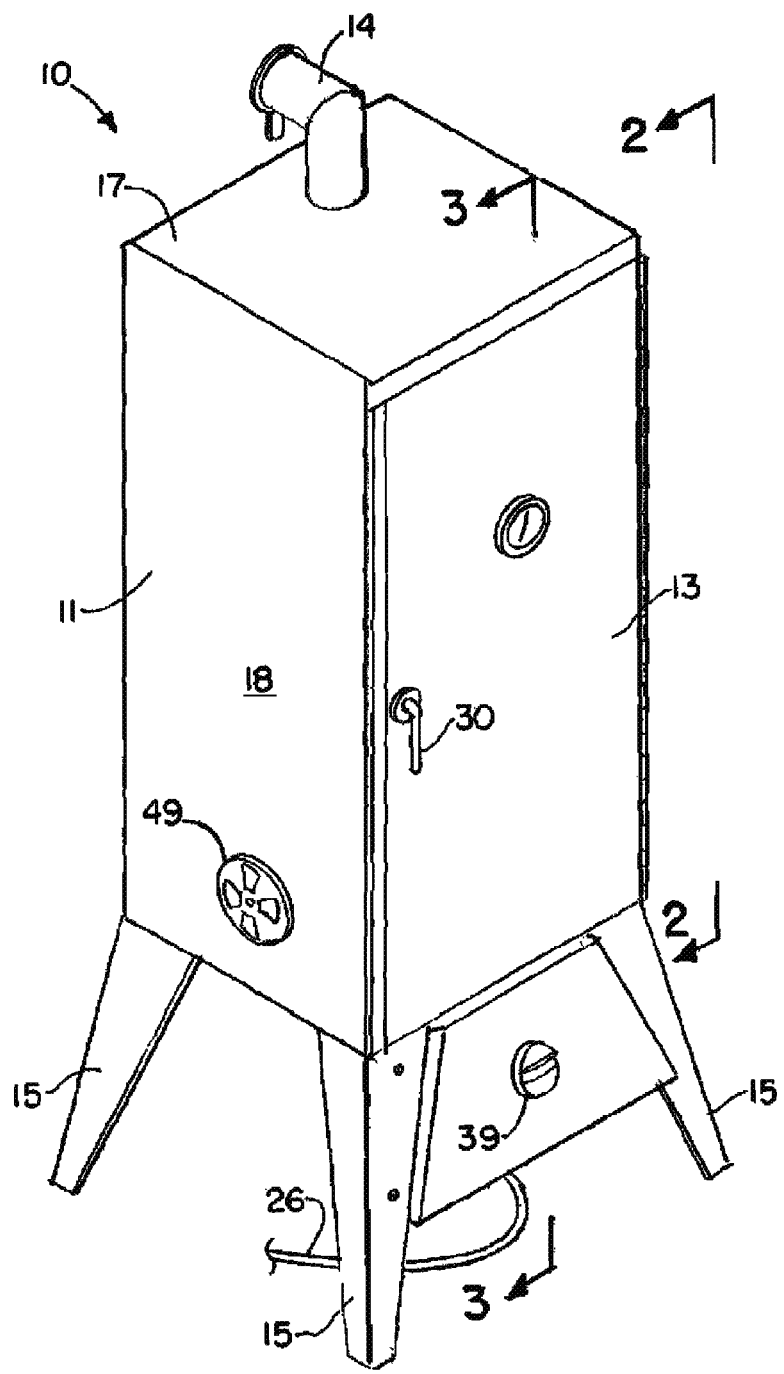
FIG. 1 is a perspective view of the preferred embodiment of the apparatus of the present invention.
Figure 2:
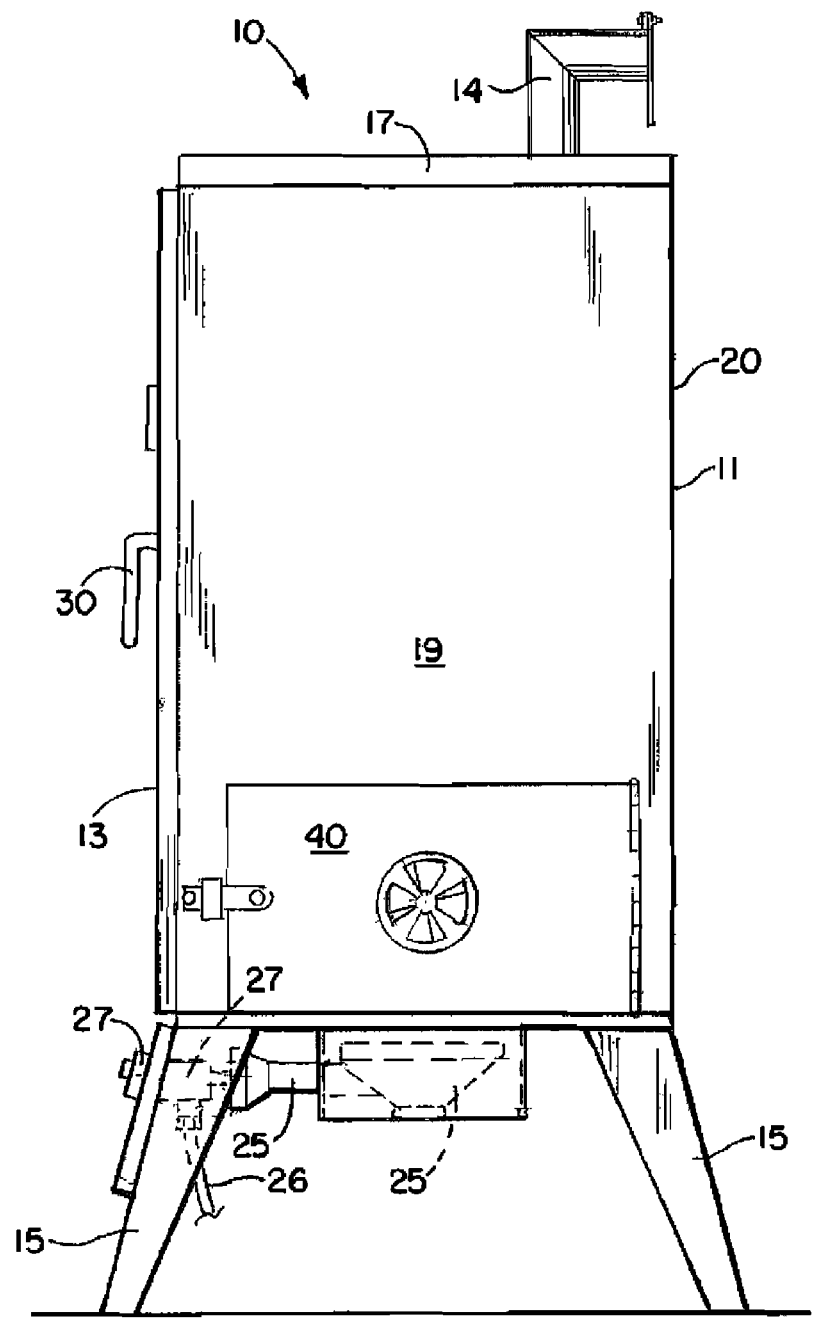
FIG. 2 is a side view of the preferred embodiment of the apparatus of the present invention.
Figure 3:
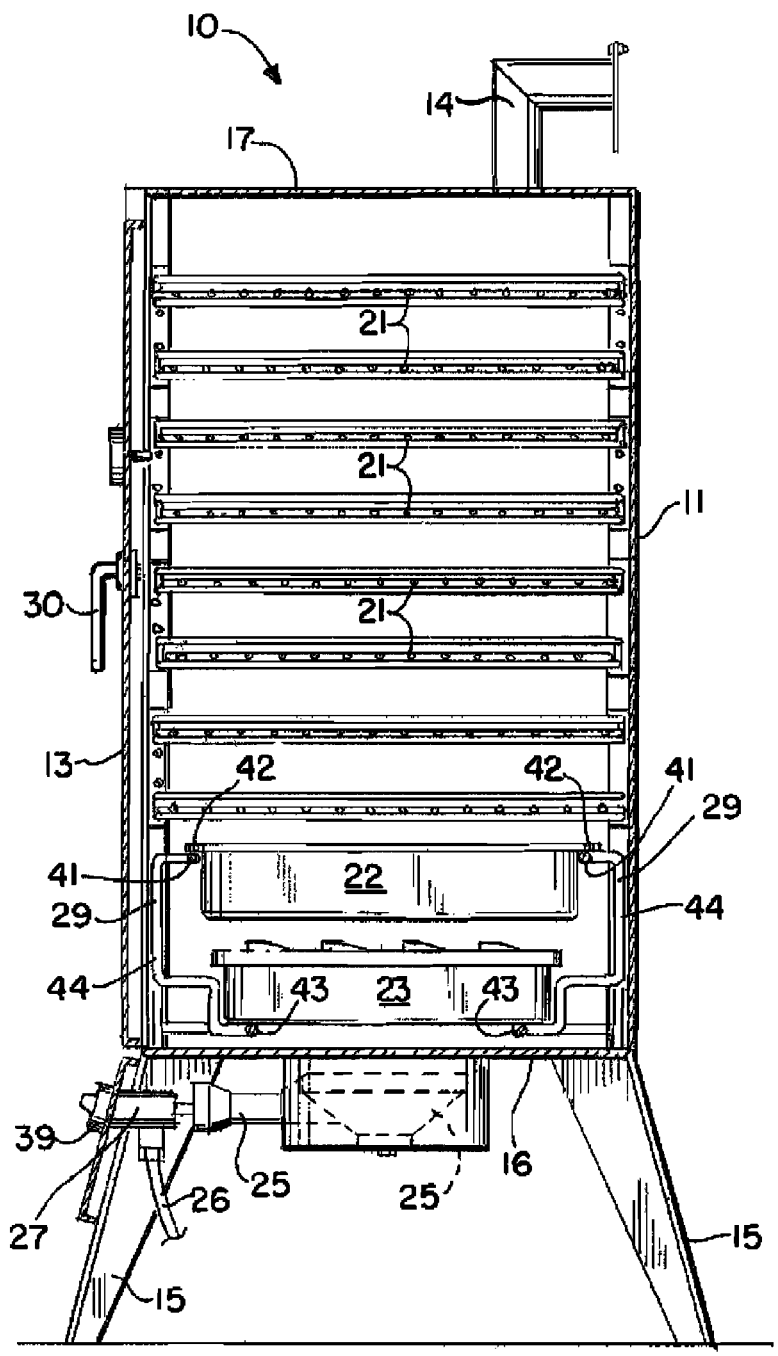
FIG. 3 is a sectional view taken along lines 3-3 of FIG. 1.
Figure 4:
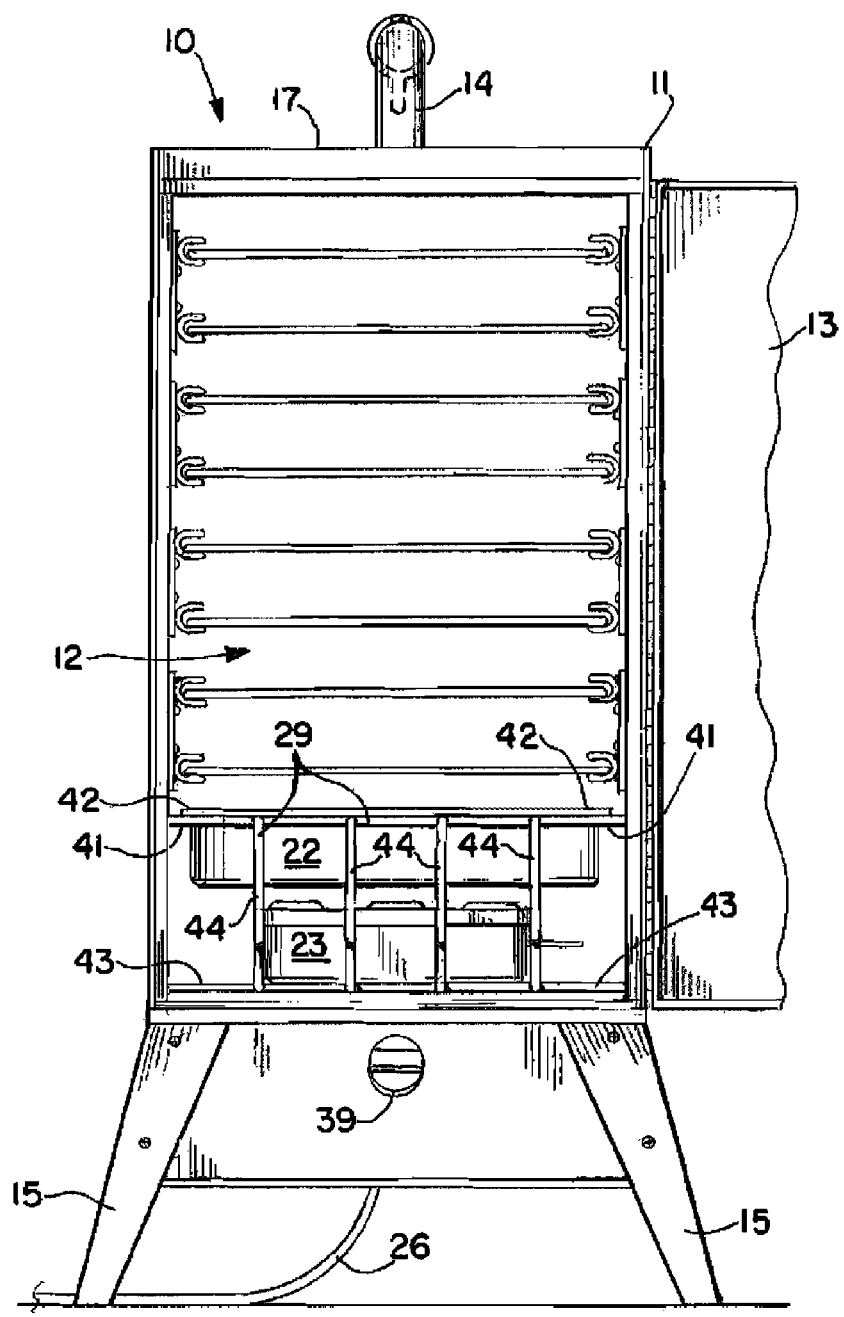
FIG. 4 is a side sectional view of the preferred embodiment of the apparatus of the present invention.
Figure 5:
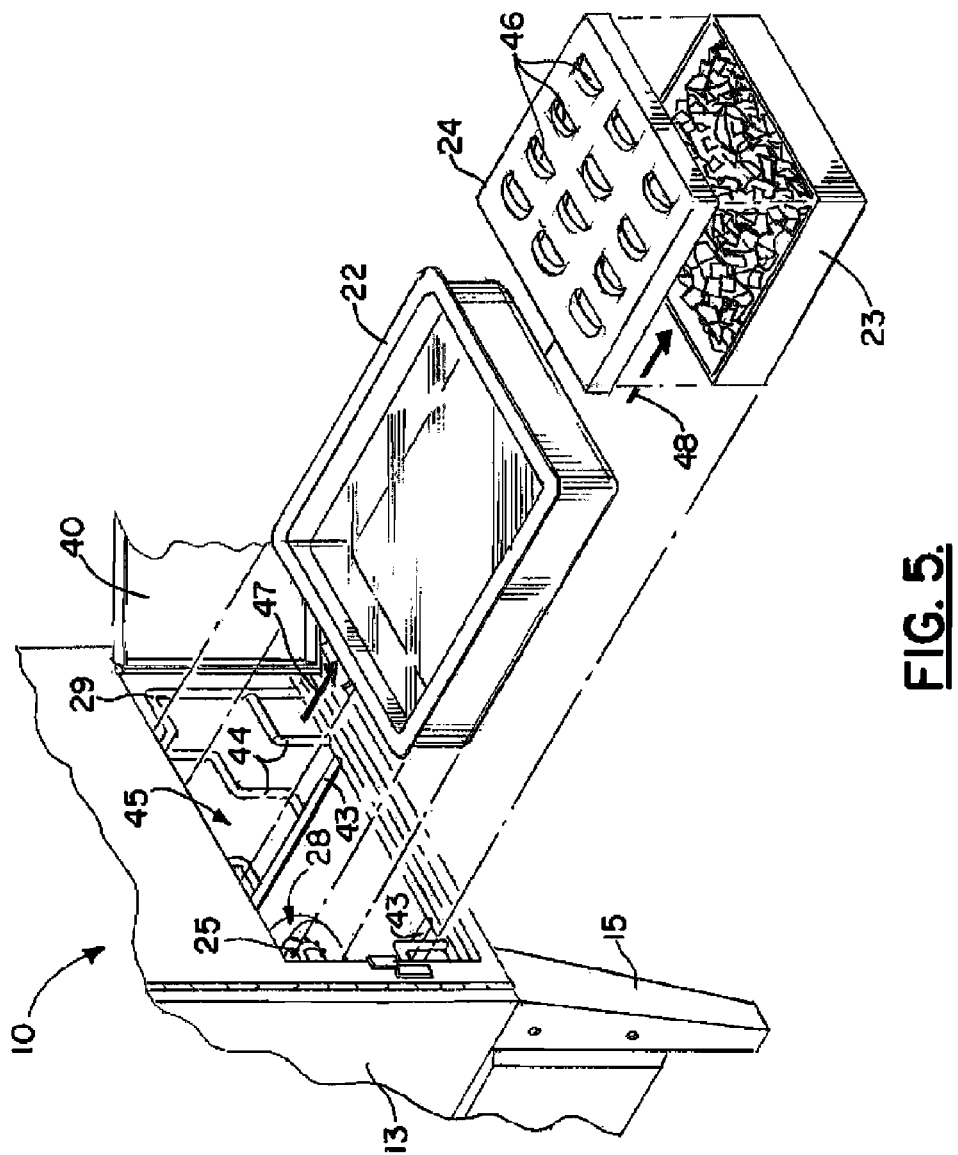
FIG. 5 is a fragmentary perspective view of the preferred embodiment of the apparatus of the present invention.

FIGS. 1-5 show the preferred embodiment of the apparatus of the present invention designated generally by the numeral 10. Smoker apparatus 10 provides an elongated vertically extended cabinet 11 having an open front 12 that allows a user to obtain access to a plurality of vertically spaced apart shelves 21 that are contained within cabinet 11.

The open front 12 can be closed during use with front door 13 which has a closure latch 30. The cabinet 11 has a bottom panel 16, a top panel 17, side panels 18, 19, rear panel 20 and a plurality of legs 15. A vent pipe 14 can be attached to the upper end portion of cabinet 11, such as to top panel 17. An air intake valve 49 can be mounted to the lower end portion of cabinet 11 (see FIG. 1).

In an alternate embodiment (FIGS. 6-7), the legs 15 are replaced with a burner frame 31 that has its own base 32 and legs 33. In the alternate embodiment, the cabinet 11 does not have legs 15 but rests upon the burner frame 31 which also supplies heat via its burner element 37 as will be described more fully hereinafter.

At the lower end portion of cabinet 11 there is provided a specially configured slide bracket 29 that supports a pair of containers or pans including an upper water container or pan 22 and a lower wood chips container or pan 23. The wood chips pan 23 is preferably provided with a perforated lid 24 having perforations 46 that are sized and shaped to enable smoke to be emitted from the burning chips of wood that are placed in pan 23 and ignited with a flame so that during use the chips of wood smoulder and generate smoke as is desirable.

The bottom panel 16 provides an opening 28. A burner element 25 is positioned immediately below opening 28 so that heat generated by burner element 25 rises upwardly via opening 28 to the bottom of wood chips pan 23. Heat further rises upwardly and heats the water contained in water pan 22 and the food to be smoked.

The burner element 25 can be supplied with a gaseous fuel product such as butane or propane via a fuel supply hose 26 and known regulator that can be attached to a commercially available butane or propane containing cannister. Control knob 39 and valve 27 enables the flow of fuel to burner 25 to be opened or closed, enabling the heat generated by burner element 25 to be controlled.

In the preferred embodiment, there is a side door 40 attached to side panel 19 that is preferably much smaller than the front door 13. Door 40 can be a part of side panel 18 or 19 (see FIG. 2). The smaller door 40 is of a size that when opened, allows a user to slide either pan 22 or 23 laterally through the opening 45 in side wall 18 or 19 that is exposed when the side door 40 is opened (see arrows 47, 48 in FIG. 5).

Each of the pans 22, 23 is supported by a rail or slide part of the bracket 29. The slide bracket 29 features a plurality of vertically extended specially shaped bars 44 that extend between a lower rail or slide 43 and an upper rail or slide 41. The upper pan 22, preferably a water pan, has a pan shoulder or flange 42 that engages rail 41 so that the pan 22 slides upon rail 41 at the flange 42. The lower rail 43 is positioned inwardly of the upper rail 41 as shown. This enables the lower rail 43 to support the underside of wood chips pan 23 as shown.

Figure 6:
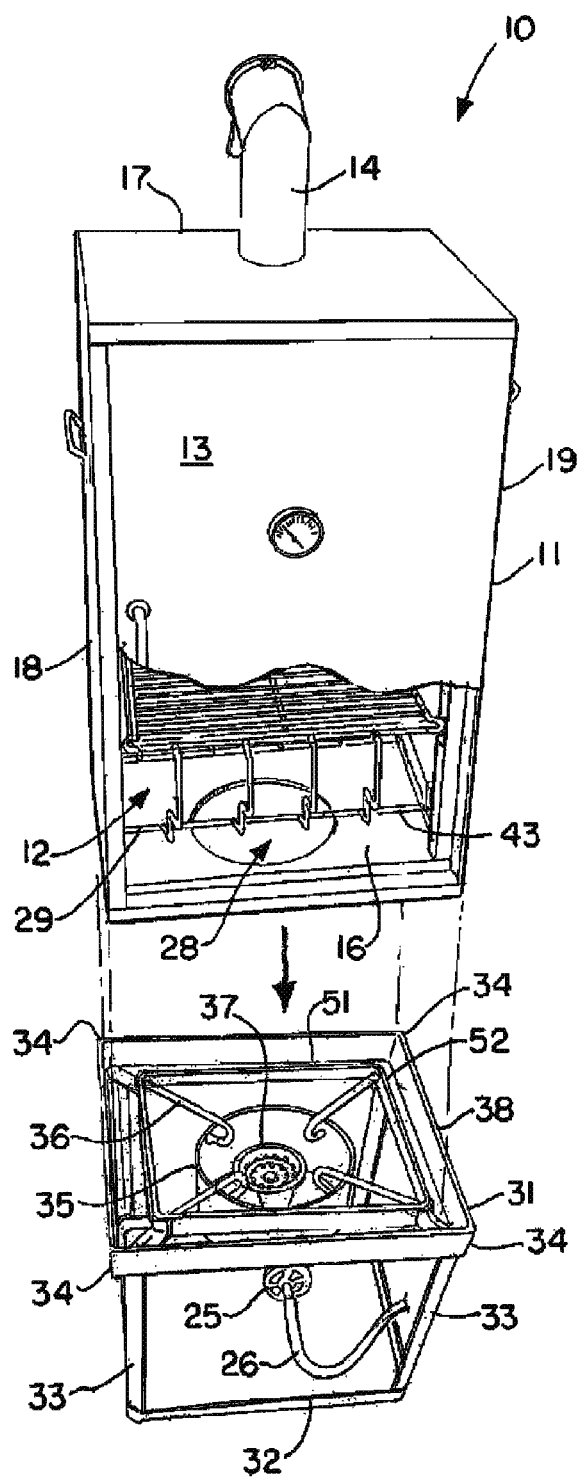
FIG. 6 is a partial cutaway perspective view of the preferred embodiment of the apparatus of the present invention illustrating an alternate support for the cabinet in the form of a burner.
Figure 7:
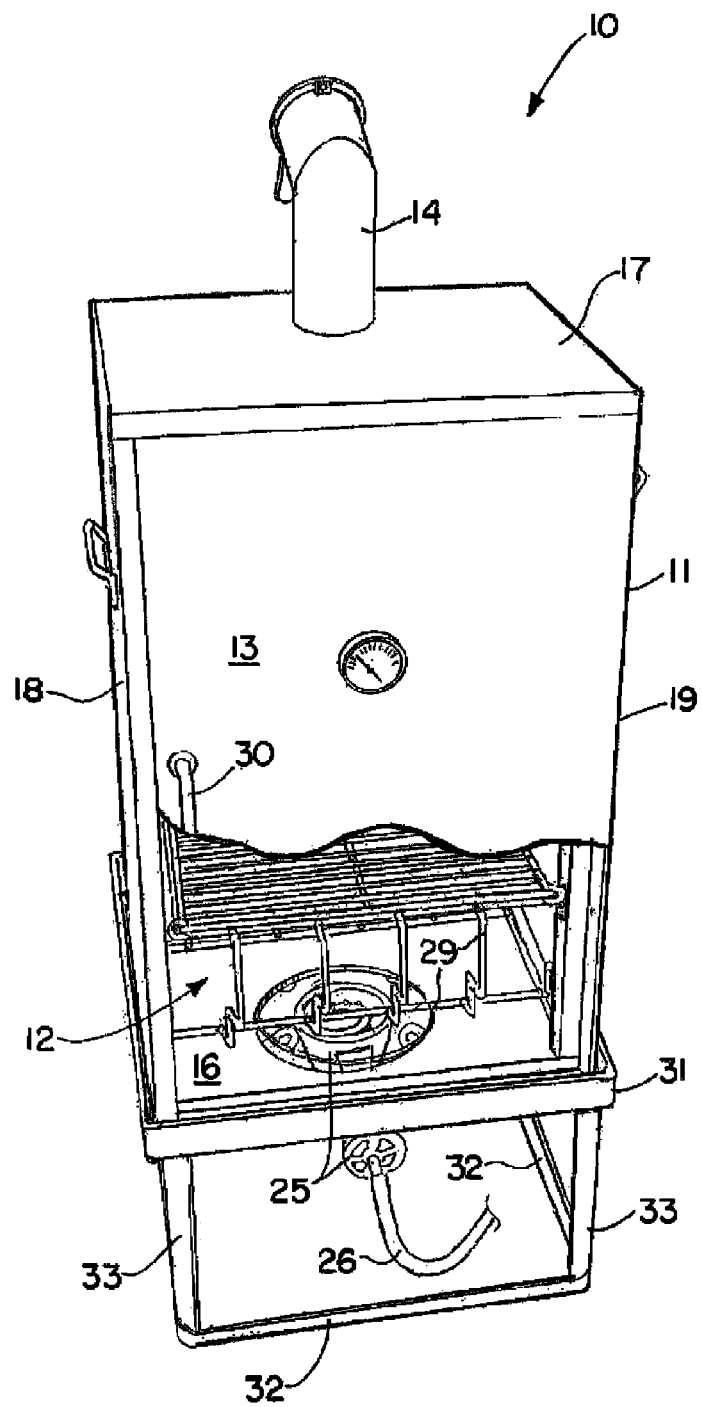
FIG. 7 is a partial cutaway perspective view of the preferred embodiment of the apparatus of the present invention illustrating an alternate support for the cabinet in the form of a burner.

As an optional under carriage, burner frame 31 can be substituted in place of legs 15 (see FIGS. 6-7). In that regard, the burner frame 31 has a rectangular or square base 32 comprised of a plurality of connected lower beams, legs 33 that extend upwardly from base 32 and corners 34 that are defined by the legs 33 and upper beams 38.

A wind guard 35 is supported by a plurality of grates 36. A burner element 37 is contained within wind guard 35. The upper beams 38 can be vertically extended or ell shaped in cross section so that when the cabinet 11 is placed upon burner frame 31, the upper beams 38 restrict lateral movement of the cabinet 11. Thus the upper beams 38 can be vertically extended flat bars, for example or ell shaped angle bars having vertical 51 and horizontal 50 sections. If angle bars are used for upper beams 38, the cabinet 11 can rest upon the horizontal section of the angle bar, wherein the bottom panel 16 of the cabinet 11 engages the horizontal portion 50 of the upper beam 38.

Figure 8:
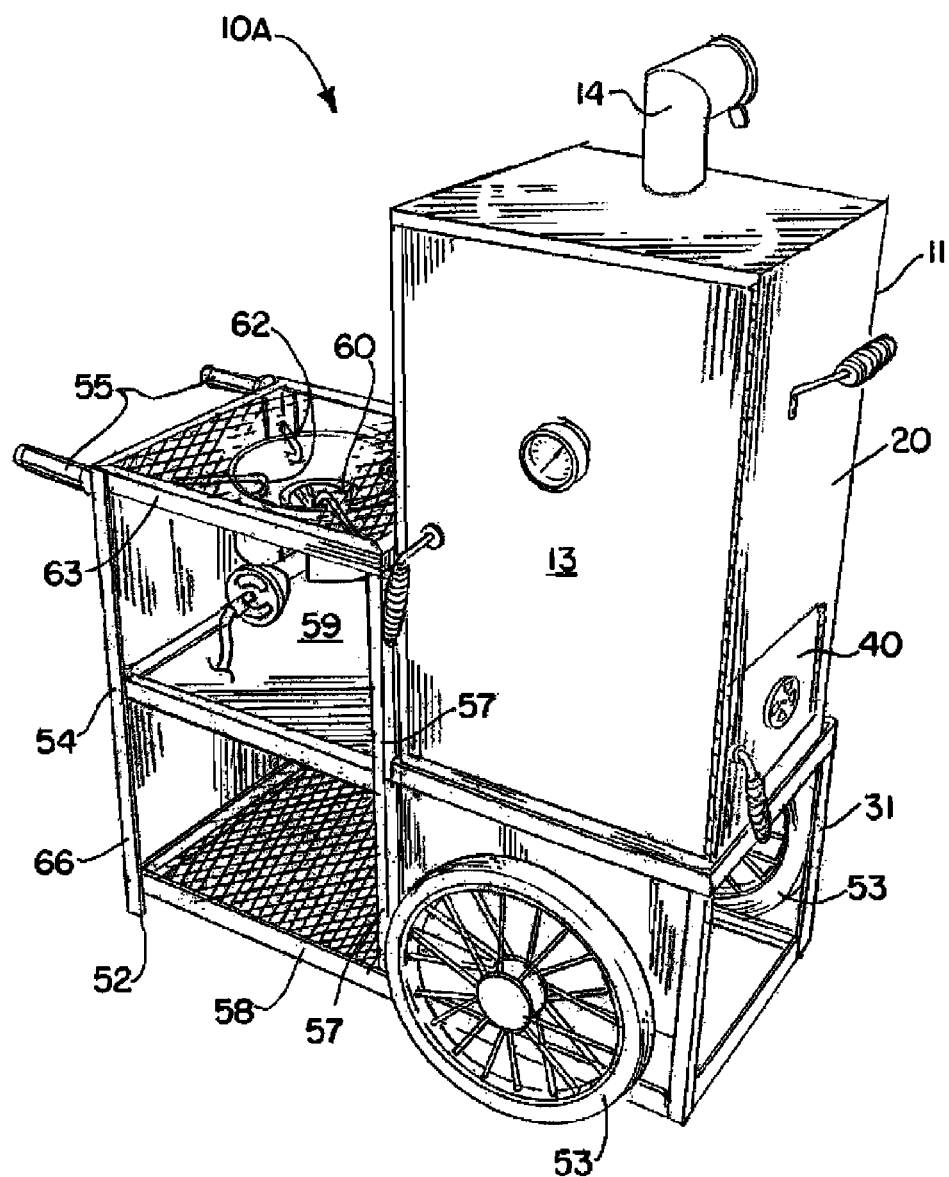
FIG. 8 is a perspective view of another embodiment of the apparatus of the present invention.
Figure 9:
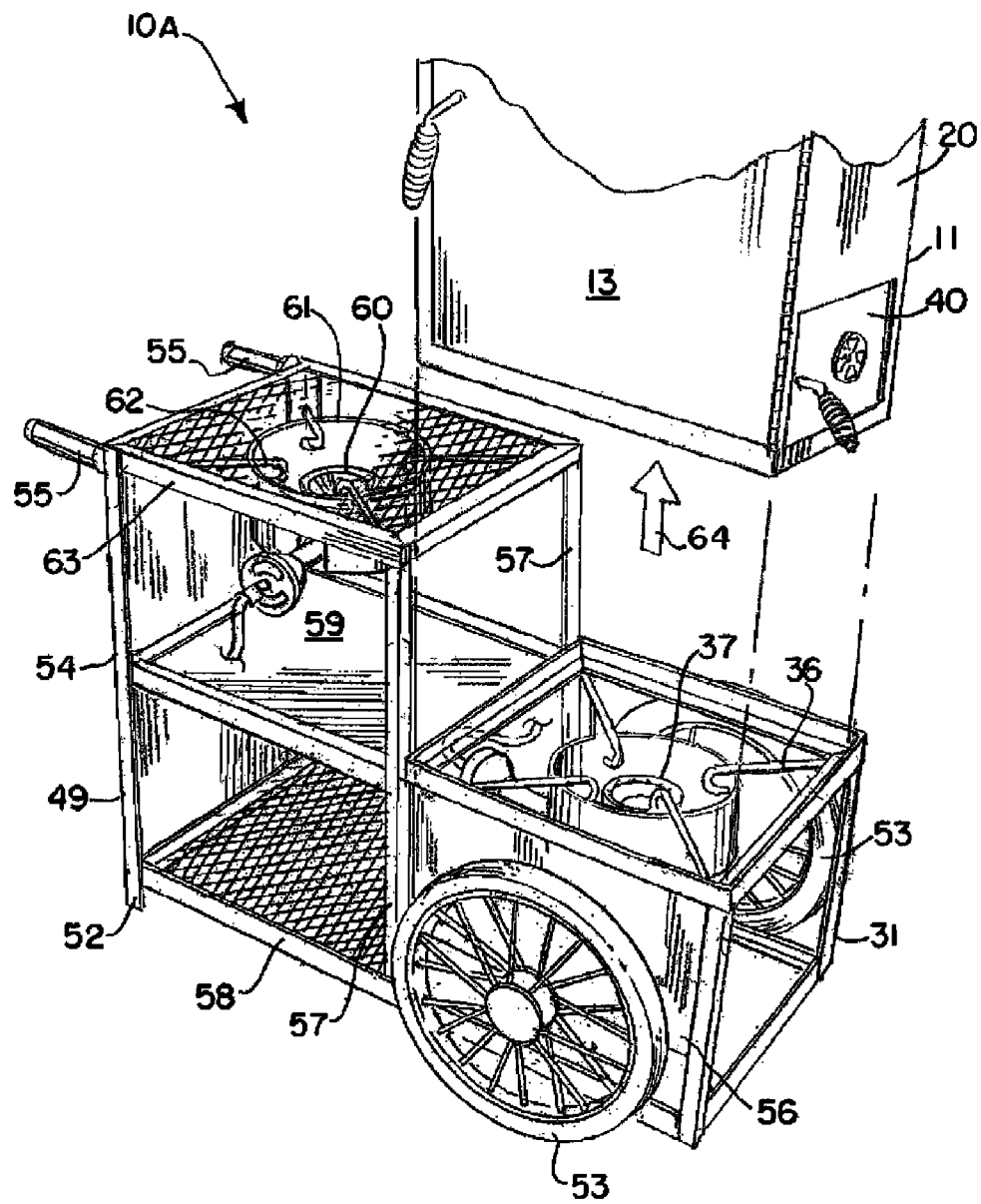
FIG. 9 is a perspective exploded view of another embodiment of the apparatus of the present invention.

FIGS. 8 and 9 show an additional embodiment of the apparatus of the present invention, designated generally by the numeral 10A. Smoker apparatus 10A in FIGS. 8 and 9 provides a cart 66 that has two burners. One burner can be a burner frame 31 with burner element 37 as with the embodiment of FIGS. 6 and 7. As with the embodiment of FIGS. 6 and 7, the cabinet 11 nests upon the burner frame 31. FIG. 8 shows the cabinet 11 resting upon burner frame 31. FIG. 9 shows the cabinet 11 lifted vertically from frame 31 as indicated by arrow 64.

In the embodiment of FIGS. 8 and 9, the frame 31 is part of a cart 66. The cart 66 provides a pair of feet 52 and a pair of wheels 53. The frame 31 is attached to a pair of legs 57 that extend upwardly from bottom shelf 58. Frame 31 can be attached to legs 57 using welding for example. At a position next to the lower end of frame 31, the cart 66 provides bottom shelf 58. At a position near the top of burner frame 31, cart 66 provides middle shelf 59. Above the shelves 58, 59 is provided an upper burner 65 that includes a burner element 60 surrounded by wind guard 61, the wind guard being supported by grate members 62. In the embodiment of FIGS. 8 and 9, there can be four grate members 62, each one extending along a radial line from a leg 54 or 57 toward the center of burner element 60. Thus, the cart 66 provides an upper burner 65 that includes the same basic burner elements as the burner frame 31 of FIGS. 6-7 and 8-9. The cart 66 has legs 54 that extend upwardly from feet 52 and that connect with burner top 63 and handles 55 as shown in FIGS. 8 and 9.

The arrangement of FIGS. 8 and 9 enables a cook to prepare certain food items for smoking within cabinet 11 and other food items to be cooked upon upper burner 65 when placed upon burner top 63. Burner top 63 can be open so that a pot or other item to be used for cooking can be placed directly upon grate members 62. Alternatively, burner top 63 can be covered with a mesh or like covering that enables items to be warmed or slow cooked.

The following is a list of parts and materials suitable for use in the present invention.

| PARTS LIST | |
| --- | --- |
| Part Number | Description |
| 10 | smoker apparatus |
| 10A | smoker apparatus |
| 11 | cabinet |
| 12 | open front |
| 13 | front door |
| 14 | vent |
| 15 | leg |
| 16 | bottom panel |
| 17 | top panel |
| 18 | side panel |
| 19 | side panel |
| 20 | rear panel |
| 21 | shelf |

-continued

PARTS LIST

| Part Number | Description |
| --- | --- |
| 22 | water pan |
| 23 | wood chips pan |
| 24 | perforated lid |
| 25 | burner element |
| 26 | fuel supply hose |
| 27 | regulator |
| 28 | opening |
| 29 | slide bracket |
| 30 | latch |
| 31 | burner frame |
| 32 | base |
| 33 | leg |
| 34 | corner |
| 35 | wind guard |
| 36 | grate |
| 37 | burner element |
| 38 | upper beam |
| 39 | control knob |
| 40 | side door |
| 41 | upper rail |
| 42 | pan shoulder |
| 43 | lower rail |
| 44 | bar |
| 45 | opening |
| 46 | perforation |
| 47 | arrow |
| 48 | arrow |
| 49 | cart |
| 50 | horizontal section |
| 51 | vertical section |
| 52 | foot |
| 53 | wheel |
| 54 | leg |
| 55 | handle |
| 56 | wheel support |
| 57 | leg |
| 58 | bottom shelf |
| 59 | middle shelf |
| 60 | burner element |
| 61 | wind guard |
| 62 | grate |
| 63 | burner top |
| 64 | arrow |
| 65 | upper burner |
| 66 | cart |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A smoker apparatus comprising:
a) a smoker cabinet having upper and lower end portions, the cabinet having a top, a bottom and one or more side walls, a cabinet interior, a main, upper opening below the top and a lower container access opening that is below the main, upper opening;
b) a plurality of vertically spaced apart shelves mounted within the cabinet interior below the top;
c) a cabinet door panel below the top that enables access to the shelves, the cabinet door panel being attached to a side wall and movable between an open position that enables access to the shelves via the upper opening and a closed position that closes the upper opening;
d) a heat source that is positioned next to the lower end portion of the cabinet and below the shelves;
e) a pair of containers mounted within the cabinet, said containers both positioned in between the shelves and the heat source;
f) one of the containers being a water container for containing water;
g) the other of the containers being a wood chips container for containing wood chips, wherein the wood chips container is positioned in between the water container and the heat source, and wherein the lower container access opening extends above and below said pair of containers;
h) supports below the shelves that support the containers, said supports positioned generally in between the heat source and the shelves;
i) the lower container access opening covered by a movable access panel, the movable access panel being movable between open and closed positions and the movable access panel providing access to both said containers in the open position; and
j) wherein, when the cabinet door panel is closed, the lower container access opening is sized and shaped to enable both containers to be removed from the cabinet through the lower container access opening.

2. The smoker apparatus of claim 1 wherein the cabinet is generally rectangular, having a plurality of side walls and the cabinet door panel is a frontal door panel that defines at least a part of one of the sides when the cabinet door panel is moved to a closed position.

3. The smoker apparatus of claim 1 wherein the heat source is supported by the cabinet below the lower container access opening.

4. The smoker apparatus of claim 1 wherein the cabinet has a pair of side walls and the movable access panel is positioned at one of the side walls.

5. The smoker apparatus of claim 1 wherein the movable access panel is sized and shaped to enable both the containers to be simultaneously removed from the cabinet by laterally sliding both containers completely through the lower container access opening.

6. The smoker apparatus of claim 1 wherein the movable access panel has a width and a height, and the pair of containers have respectively first and second widths, and the width of the lower movable access panel is greater than both the first and second widths.

7. The smoker apparatus of claim 6 wherein the pair of containers have respectively first and second heights, and the height of the movable access panel is greater than the combined first and second heights.

8. The smoker apparatus of claim 6 further comprising a base that supports the heat source.

9. A smoker apparatus comprising:
a) a smoker cabinet having upper and lower end portions, the cabinet having a top panel, a bottom panel, a rear wall, a pair of side walls, an interior and a pair of openings, one of the openings being a first, upper opening below the top, the other opening being a second, lower opening that is smaller than the first, upper opening;
b) a plurality of vertically spaced apart shelves mounted within the cabinet interior;
c) the cabinet supporting a movable cabinet door panel that can be opened and closed, the cabinet door panel enabling access to the shelves via the first, upper opening when the cabinet door pane is opened;
d) a heat source that is positioned next to the lower end portion of the cabinet and below the shelves;

e) a pair of containers mounted within the cabinet below the shelves and above the heat source, each container having a vertical dimension;

f) one of the containers being a water container for containing water:

g) the other of the containers being a wood chips container for containing wood chips, wherein the wood chips container is positioned in between the water container and the heat source, and wherein the second, lower opening extends above and below said pair of containers;

h) holders that support the containers, the holders positioned generally in between the heat source and the shelves;

i) a movable access panel that can be opened or closed to provide access to the containers; and j) wherein, when the cabinet door panel is closed and when the movable access panel is opened, either container can be moved laterally relative to the cabinet at least a partial distance by moving it laterally from its holder and at least fifty percent partially-through the second, lower opening, thereby enabling a user to add wood chips to the wood chips container or water to the water container without having to open the cabinet door panel.

10. The smoker apparatus of claim 9 wherein the cabinet is generally rectangular, having a plurality of side walls and the cabinet door panel is a frontal door that defines one of the sides when the door is moved to a closed position.

11. The smoker apparatus of claim 9 wherein the heat source is supported by the cabinet next to the lower opening.

12. The smoker apparatus of claim 9 wherein the cabinet has a pair of side walls and the movable access panel is mounted to one of the side walls.

13. The smoker apparatus of claim 9 wherein the cabinet has a rear wall and the movable access panel is mounted to the rear wall.

14. The smoker apparatus of claim 9 wherein the cabinet has a base.

15. The smoker apparatus of claim 14 wherein the base has multiple legs.

16. The smoker apparatus of claim 14 wherein the base is a frame that supports the heat source.

17. A smoker apparatus comprising:

a) a smoker cabinet having upper and lower end portions, the cabinet having a top, a bottom and a side wall or walls, an interior and a front opening below the top that provides access to the interior;

b) a plurality of vertically spaced apart shelves mounted within the cabinet interior;

c) a cabinet main door panel that can be opened and closed, enabling access to the shelves via the front opening when the door panel is opened;

d) a gaseous fuel supplied heat source that is positioned next to the lower end portion of the cabinet, the heat source being removably connectable to a source of gaseous fuel;

e) a pair of containers mounted within the cabinet below the shelves and above the heat source, each container having a vertical dimension;

f) one of the containers being a water pan for containing water, g) the other of the containers being a wood chips container for containing wood chips, wherein the wood chips container is positioned in between the water container and the heat source;

h) one or more brackets that support the containers, each bracket positioned generally between the heat source and the shelves;

i) the cabinet having a container door opening positioned below the main door panel and extending above and below the pair of containers, the container door opening having a container access panel that can be opened and closed, the container access panel being positioned to extend lower than the cabinet door; and j) wherein, when the cabinet main door panel is closed, and the container access panel is opened, either container can be completely removed laterally from the cabinet by moving it laterally through the container door opening.

18. The smoker apparatus of claim 17 wherein the cabinet has a pair of side walls and the container access panel is mounted to one of the side walls.

19. The smoker apparatus of claim 17 wherein the container access panel extends to the top of the water pan.

20. The smoker apparatus of claim 17 wherein the container access panel extends below the wood chips container.

21. The smoker apparatus of claim 17 wherein the cabinet is generally rectangularly shaped in profile, having a plurality of rectangular side walls and the cabinet door is a frontal door that defines one of the side walls when the main door panel is moved to a closed position.

22. The smoker apparatus of claim 17 wherein there are a plurality of said brackets.

23. The smoker apparatus of claim 17 wherein separate brackets support each of the containers.

24. The smoker apparatus of claim 23 wherein the conatiner access panel extends above and below the brackets.

25. The smoker apparatus of claim 17 wherein the container access panel is below at least part of the cabinet door.

26. A smoker apparatus comprising:

a) a smoker cabinet having upper and lower end portions, the cabinet having a top, a bottom and a side wall or walls, an interior, and a front opening below the top;

b) a plurality of vertically spaced apart shelves mounted within the cabinet interior;

c) a cabinet main door panel that can be opened and closed, enabling access to the shelves, the cabinet door extending upwardly to a position next to the cabinet top;

d) the cabinet having a source of heat located at the lower end portion of the cabinet;

e) a pair of containers mounted within the cabinet interior below the shelves and above the source of heat, the containers having a combined vertical dimension:

f) one of the containers being a water container for containing water;

g) the other of the containers being a wood chips container for containing wood chips, wherein the wood chips container is positioned in between the water container and source of heat, and wherein a lower access opening extends above and below said pair of containers;

h) upper and lower supports that hold the containers including an upper support for holding the water container and a lower support for holding the wood chips container, the supports positioned generally in between the source of heat and the shelves;

I) the lower access opening covered by an access panel, the access panel extending vertically the combined vertical dimension that is occupied by the containers, the access panel being movable between open and closed positions; and j) wherein, when the cabinet main door panel is closed, the access panel is sized and shaped to enable either container to be removed completely laterally from the cabinet by sliding it laterally upon said supports and through the access opening when the access panel is in the open position.

* * * * *